Figure 1:
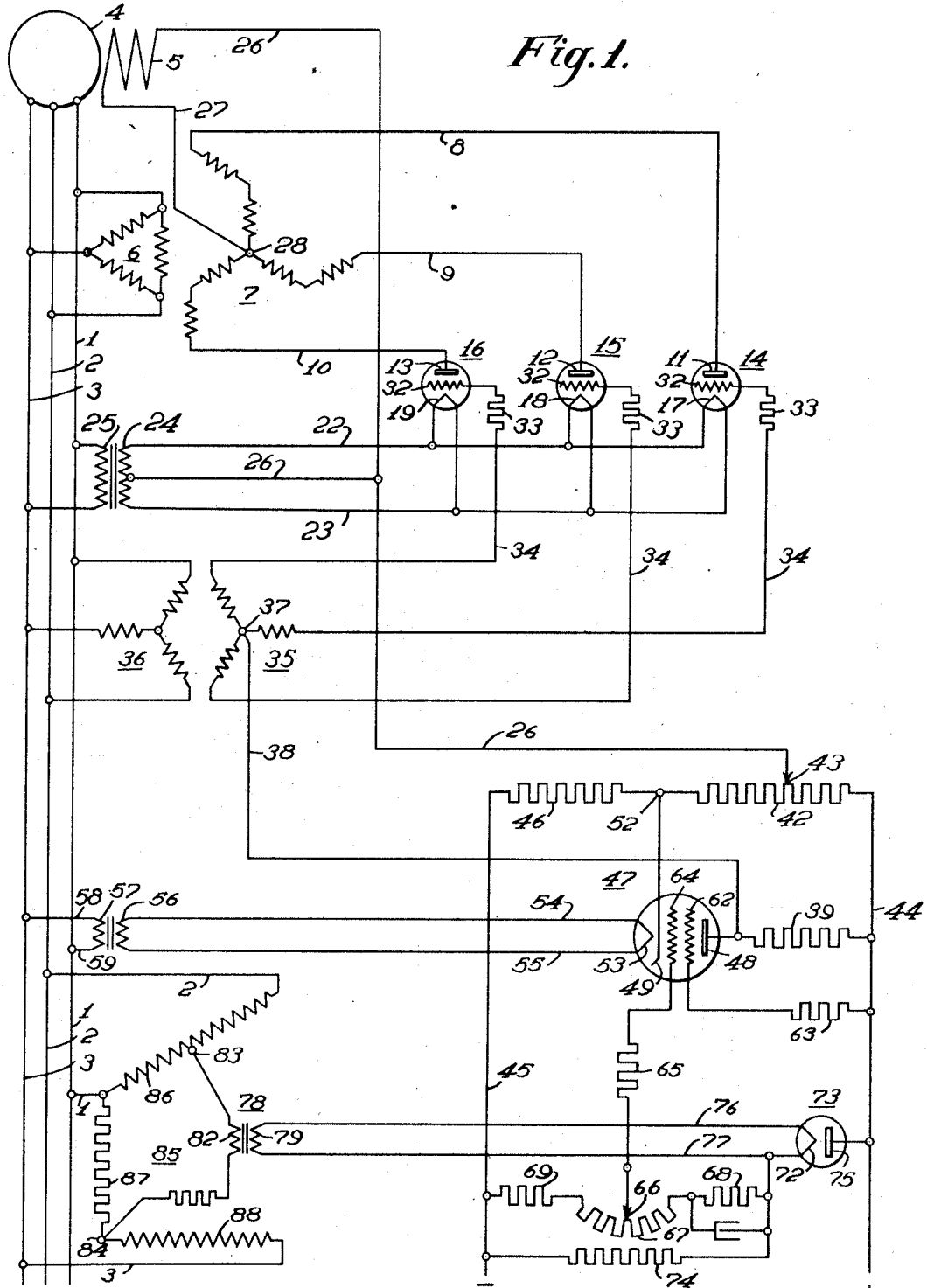

Oct. 8, 1940.   D. W. EXNER   2,217,473
TEMPERATURE COMPENSATION FOR VOLTAGE REGULATORS
Filed Feb. 16, 1940   2 Sheets-Sheet 1

WITNESSES:   INVENTOR
Edward Michael   Donald W. Exner.
Wm. C. Groome   BY Franklin E. Hardy
   ATTORNEY Oct. 8, 1940.  D. W. EXNER  2,217,473
TEMPERATURE COMPENSATION FOR VOLTAGE REGULATORS
Filed Feb. 16, 1940
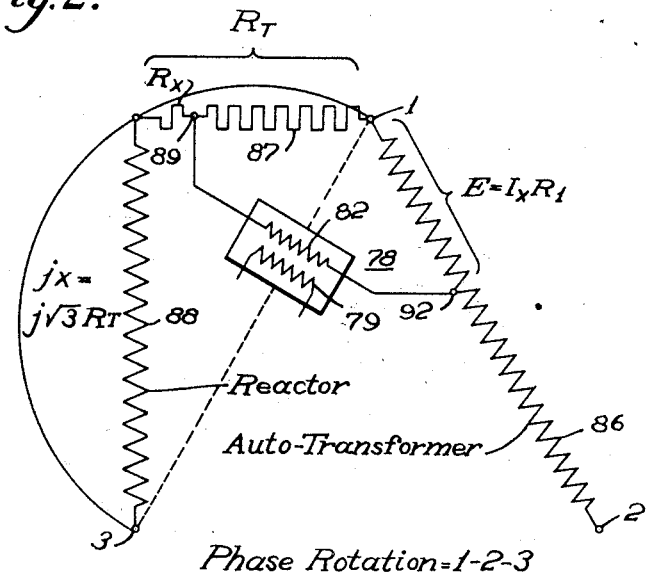
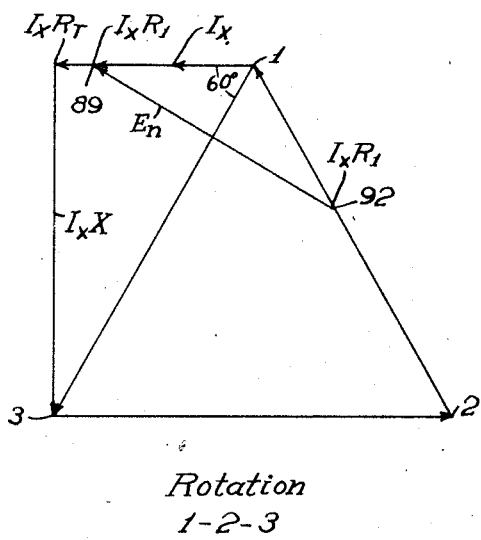
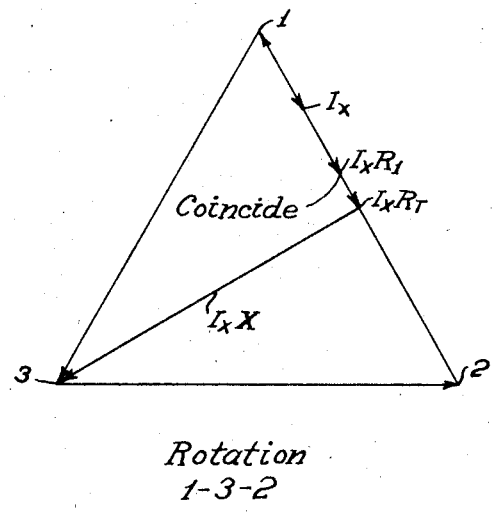
WITNESSES:
INVENTOR
Donald W. Exner.
BY
ATTORNEY Patented Oct. 8, 1940

2,217,473

UNITED STATES PATENT OFFICE 2,217,473

TEMPERATURE COMPENSATION FOR VOLTAGE REGULATORS

Donald W. Exner, Forest Hills, Pa., assignor to Westinghouse Electric & Manufacturing Company, East Pittsburgh, Pa., a corporation of Pennsylvania Application February 16, 1940, Serial No. 319,319

12 Claims. (Cl. 171—119)

My invention relates to temperature compensating means for voltage responsive devices for eliminating or reducing the errors caused by changes of the temperature of the circuit parts. In voltage regulators, for example, as well as other voltage responsive devices, it is desirable that the mechanism have a constant performance characteristic without regard to the temperature of the parts.

When a voltage regulator for a polyphase alternating current generator is connected across one phase only of the polyphase circuit it regulates for constant voltage on this phase alone and with unbalanced phase loading of the machine, the other phase voltages may vary widely from the desired value. For this reason, it is frequently desirable to energize the voltage measuring element of the regulator through a positive sequence network so as to regulate for a constant magnitude of the positive sequence component of voltage. As a result the numerical average of the phase voltages is held practically constant for moderate degrees of voltage unbalance.

Since temperature variations are unavoidable and since the most common circuit elements involve copper windings whose resistance increases with temperature, various expedients have been used to counteract this effect on the voltage measuring element of the regulator and thereby to obtain a substantially constant current through the voltage measuring element independently of the temperature thereof. Such expedients have made use of large ballast resistors made of near zero temperature coefficient material or of material having a negative temperature coefficient. These arrangements involve circuit elements and additional power losses beyond those actually needed to perform the regulating function. The use of zero temperature coefficient ballast means can only approach the result since it is usually uneconomical to permit a high enough loss in the ballast resistor to make it fully effective.

It is an object of my invention to provide for compensating for the effect of temperature on the resistivity of voltage responsive devices when phase sequence responsive networks or other networks having similar characteristics are used to supply energy to a voltage measuring device.

Other objects and advantages of the invention will be apparent from the following description of one preferred embodiment thereof, reference being had to the accompanying drawings.

In the drawings,

Figure 1 is a diagrammatic view of circuits and apparatus embodying one application of the invention; and Figs. 2, 3 and 4 are diagrams illustrating a phase sequence network and the voltage factors between the several parts thereof.

Referring to the drawings, and particularly to Fig. 1, an alternating current circuit is illustrated comprising power circuit conductors 1, 2 and 3 having a phase sequence of 1—2—3 that are connected to an armature 4 of a three-phase alternating current generator having a field winding 5. The field winding is supplied with energy through a rectifier system receiving its power from a transformer having a primary winding 6 connected to the power circuit conductors 1, 2 and 3, and a secondary winding 7 which serves as a power or anode transformer and which is shown as of the Y-connected distributed type, portions of each leg of the Y including windings inductively relates to each of two phases of the three-phase circuit. The outer ends of the Y-connected windings are connected by conductors 8, 9 and 10 to anodes 11, 12 and 13 of three rectifier tubes 14, 15 and 16, respectively, which are also provided with cathodes 17, 18 and 19, respectively, that are connected by conductors 22 and 23 to the secondary winding 24 of a filament transformer, having a primary winding 25 connected across line circuit conductors 1 and 3.

The circuit supplying unidirectional current from the tubes 14, 15 and 16 is completed from winding 24 through conductor 26, field winding 5, and conductor 27 to the neutral point 28 of the anode transformer secondary winding 7. The tubes 14, 15 and 16 are each provided with control grids 32 connected through resistors 33 and conductors 34 to the three outer ends of a Y-connected secondary winding 35 of a phase-shifting transformer, the primary winding 36 of which is connected to the three phase conductors 1, 2 and 3. The grid control circuit for the tubes 14, 15 and 16 extends from the grids 32 through the phase-shifting transformer windings 35, and from the neutral point 37 thereof through conductor 38, a resistor 39, a portion of resistor 42, as selected by a movable contact member 43, and by conductor 26, filament transformer winding 24, and conductors 22 and 23 to the cathodes 17, 18 and 19 of the three tubes 14, 15 and 16, respectively. The junction between the resistors 39 and 42 connects with a conductor 44 which is one terminal of a unidirectional potential source represented by the positive conductor 44 and the negative conductor 45.

The resistor 42 is connected as a bleeder resistor in series with a resistor 46 between the conductors 44 and 45. The resistor 39 is connected in series with an amplifier tube 47 having an anode 48 that is connected to the end of resistor 39 to which the conductor 38 is connected, a cathode 49 that is connected to a junction point 52 between the resistors 42 and 46, and a heater 53. The heater is connected by conductors 54 and 55 to the secondary winding 56 of a heater transformer having a primary winding 57 that is connected by conductors 58 and 59 to power circuit conductors 1 and 3. The tube 47 is also provided with a screen grid 62 shown connected through a resistor 63 to the positive conductor 44, and with a control grid 64 that is connected through a resistor 65 and a movable contact element 66 to a selected point on a resistor 67. The resistor 67 is connected in series with resistors 68 and 69 between a cathode 72 of a detector tube 73 and the negative conductor 45. A resistor 74 is connected in parallel with the three series connected resistors 67, 68 and 69. The detector tube 73 is provided with an anode 75 that is connected to the positive conductor 44, and the cathode 72 that is connected by conductors 76 and 77 to be heated from the secondary winding 79 of a filament transformer 78. The filament transformer is provided with a primary winding 82 that is connected between points 83 and 84 of a phase sequence network 85 that is, in turn, connected to conductors 1, 2 and 3.

The typical positive sequence network 85 illustrated is provided with an impedance element shown as an autotransformer 86 connected between conductors 1 and 2 and an inductive reactance branch circuit portion connected between conductors 1 and 3 including a resistor 87, one end of which is connected to conductor 1, the opposite end being connected to a reactor 88. The autotransformer 86 may be replaced with a resistor, with the tap point 83 properly chosen, if desired. The resistor and reactor are connected in series between conductors 1 and 3. Referring to diagrams in Figs. 2 and 3, $R_1$ is the resistance of resistor 87 and $R_x$ is the unavoidable resistance of the reactor 88, the two resistance components being represented by $R_t$, representing the total resistance of the branch circuit between conductors 1 and 3. The impedance of the branch circuit is so adjusted that the current through it, represented by the vector $I_x$, lags the voltage between conductors 1 and 3 by 60°. In the diagrams of Figs. 2 and 3, the filament transformer primary winding 82 is connected between a point 89 represented by the end of the vector $I_xR_1$, corresponding to the voltage drop across the resistor 87, and a point 92 on the autotransformer winding 86 that is so selected that the magnitude of the voltage vector 1—92, that is, between the conductor 1 and the selected point 92 is equal to $I_xR_1$, corresponding to the voltage drop across the resistor 87. The voltage drop across the reactor 88 is shown by the vector $I_xX$. The positive sequence component voltage 1—2—3 is represented by the vector diagram in Fig. 3 and the negative sequence component voltage corresponding to rotation 1—3—2 is represented in Fig. 4 in which the triangular portion of the diagram of Fig. 3 folds over along the line 1—3 so that the points 89 and 92 coincide and no voltage exists between them. The points 89 and 92 shown in the diagrams in Figs. 3, 4 and 5 may correspond to the points 84 and 83, respectively, in Fig. 1. Thus, a device such as the filament transformer 78 having its primary winding connected between points 89 and 92 will be responsive to a voltage $E_n$, that is proportional to the positive sequence component of the line circuit voltage having a sequence 1—2—3, but will not be responsive to a voltage corresponding to the negative sequence component of rotation 1—3—2.

The tungsten filament 72 of the voltage measuring tube 73 operates at a white heat so that its resistance is practically unaffected by changes in ambient temperature. However, the filament transformer 78 and the reactor 88 and autotransformer 86 of the positive sequence network are normally wound with copper wire whose resistance increases with increasing temperature. Thus, the operating temperatures of these parts affect the voltage applied to the filament 72 so that when heated, a lesser filament temperature results for the same line voltage between conductors 1—2—3 than when the network parts are cold.

In accordance with my invention, the network is so designed as to compensate for the temperature effect on the resistivity of the phase sequence responsive network. Referring to Figs. 2 and 3 of the drawings, if the resistance $R_1$ is increased a few per cent above the ideal value for perfect positive phase sequence selection as above explained with respect to a typical network, the voltage $E_n$ applied to the primary winding 82 of the filament transformer 78 and which is proportional to the desired sequence component will increase slightly. The circuit will no longer completely reject the undesired or negative sequence component but the degree of rejection will still be great enough for practical purposes. If the value of $E_n$ is caused to increase with the temperature increase of the parts of the network structure, and at the same rate that the resistance of the filament transformer, reactor and autotransformer windings increases, the current through this transformer will remain constant. This result is achieved in accordance with my invention by making the resistor 87 from a material whose resistance increases linearly at a suitable rate with the increasing temperature of the filament transformer, autotransformer and reactor and the temperature of the resistor 87 is made to change in proportion to the change in temperature of the transformers 78 and 86 and reactor 88. This is done by locating the resistor 87 physically in intimate proximity to the filament transformer 78, such as within the same enclosed casing, or by designing both elements to have the same thermal time constant. The resistor 87 should be designed to have a temperature coefficient of resistance such that the voltage $E_n$ will vary at the same rate as the resistance of the transformers 78 and 86 and reactor 88. The desired temperature coefficient of resistance of the resistor 87 may be effected by a proper proportional use of copper wire and of nickel-copper wire, the latter having a temperature coefficient of resistance that is practically zero while the copper wire has a comparatively high coefficient. With the network parts constructed in accordance with the invention, the voltage applied to the filament 72 of the voltage measuring tube 73 will be a sufficiently accurate measure of the positive sequence network voltage of the three-phase circuit 1—2—3, thus causing the electron emission from the cathode, which is a function of filament temperature, to control the flow of current through the tube 73, which is used to control the grid bias on the tube 47 and by that means the grid bias on the rectifier tubes 14, 15 and 16 to control the current supplied to the field winding 5 of the alternating current generator.

The grid circuit for governing the conductivity of the rectifier tubes 14, 15 and 16 extends from the cathodes 17, 18 and 19 through filament transformer winding 24, conductor 26, a portion of the resistor 42, the resistor 39, conductor 38, phase-shifting transformer winding 35, and branch conductors 34 to the several grids 32. A positive component of voltage is introduced into this circuit by the voltage drop across the portion of resistor 42 connected between the contact point 43 and the positive supply conductor 44 and a negative voltage component is introduced into the grid circuit corresponding to the voltage drop across the resistor 39. The component across the resistor 42 is determined by the flow of current between the conductors 44 and 45 through the series connected resistors 42 and 46 which remains substantially constant. The flow of current through the resistor 39 is however a variable determined by the conductivity of the tube 47 as controlled by the voltage measuring tube 73. The grid circuit of the tube 47 extends from the cathode 49 through the resistor 46, conductor 45, resistor 69, a portion of the resistor 67 as determined by the setting of the contact arm 66, and resistor 65 to the grid 64. The greater the conductivity of the voltage measuring tube 73, the greater will be the voltage applied across the network between the cathode 72 and the negative conductor 45, and consequently, the more positive will be the point of connection of the contact 66 with the resistor 67. Consequently, if the voltage of the three-phase line circuit 1—2—3 increases above the desired value, the voltage applied to the phase sequence network 85 and to the cathode 72 increases, thus increasing the conductivity of the tube 73 and making the grid 64 of the tube 47 more positive to increase the flow of current through that tube. The increased flow of current through the tube 47 increases the voltage drop across the resistor 39, thus making the grids 32 of the tubes 14, 15 and 16 more negative to decrease the supply of current to the field winding 5 and cause the generated voltage applied to the circuit conductors 1, 2 and 3 to decrease. Correspondingly, if the voltage of the line circuit conductors decreases below the desired value, the conductivity of the tube 73 is decreased, thus causing the grid 64 of the tube 47 to become more negative and pass less current so that the negative component of voltage across the resistor 39 is decreased and the grids of the tubes 14, 15 and 16 are made more positive to increase the output current therefrom to the field winding 5 and to increase the voltage applied to circuit conductors 1, 2 and 3 to the desired value.

It will be appreciated that by designing the network 85 in the manner above described, including forming the resistor 87 of material causing the coefficient of resistivity of this element to be such as to slightly increase the voltage $E_n$ applied to the filament transformer 78 in proportion to the heating of the filament transformer, autotransformer and reactors, a voltage regulating equipment is provided in which a single phase voltage responsive device is energized from a three phase circuit through a phase sequence network that is compensated for the effect of temperature on the resistivity of the voltage responsive elements of the system.

Various modifications of the circuits and apparatus illustrated, within the spirit of my invention, will occur to those skilled in the art, and I do not wish to be limited otherwise than by the scope of the appended claims.

I claim as my invention:

1. In a temperature compensating circuit for applying a single phase voltage from a three phase circuit to a voltage responsive device having an increasing resistance characteristic, with rising temperature, in combination, a positive-sequence network including an impedance element connected between the first and second conductors of a three phase circuit and a resistor and reactor connected in series between the first and third conductors of the three phase circuit, the resistor being nearer the first conductor, the voltage responsive device being connected between a point on said autotransformer and a point on said resistor, said resistor being formed from a material whose resistance increases linearly with increasing temperature and at a rate to change the voltage applied to the voltage responsive device in proportion to the increase in the temperature of the autotransformer and the voltage responsive device.

2. In a temperature compensating circuit for applying a single phase voltage from a three phase circuit to a voltage responsive device having an increasing resistance characteristic with rising temperature, in combination, a positive-sequence network including an impedance element connected between the first and second conductors of a three phase circuit and a resistor and reactor connected in series between the first and third conductors of the three phase circuit, the resistor being nearer the first conductor, the voltage responsive device being connected between a point on said autotransformer and a point on said resistor, said resistor being formed from a material whose resistance increases linearly with increasing temperature, and means for causing the temperature of the resistor to change in proportion to the temperature of the voltage responsive device and the autotransformer.

3. In a temperature compensating circuit for applying a single phase voltage from a three phase circuit to a voltage responsive device having an increasing resistance characteristic with rising temperature, in combination, a positive-sequence network including an impedance element connected between the first and second conductors of a three phase circuit and a resistor and reactor connected in series between the first and third conductors of the three phase circuit, the resistors being nearer the first conductor, the voltage responsive device being connected between a point on said autotransformer and a point on said resistor, said resistor being formed from a material whose resistance increases linearly with increasing temperature, said resistor and said voltage responsive device being positioned in intimate thermal relation for effecting like changes in temperature of the two elements.

4. In a temperature compensating circuit for applying a single phase voltage from a three phase circuit to a voltage responsive device having an increasing resistance characteristic with rising temperature, in combination, a positive-sequence network including an autotransformer connected between the first and second conductors of a three phase circuit and a resistor and reactor connected in series between the first and third conductors of the three phase circuit, the resistor being nearer the first conductor, the voltage responsive device being connected between a point on said autotransformer and a point on said resistor, said resistor being formed from a material whose resistance increases linearly with increasing temperature, said resistor and said voltage responsive device being designed to have the same thermal time constant for effecting proportional changes in temperature.

5. In combination, a three phase circuit having three phase conductors, a single phase voltage responsive device, means for applying a temperature compensated single phase voltage from said three phase circuit to said single phase voltage responsive device comprising a positive-sequence network including an autotransformer connected between two of the conductors of the three phase circuit, a resistor connected to one of said two conductors and a reactor connected in series with said resistor and to the third of said three conductors, the voltage responsive device being connected between a point on said autotransformers and a point on said resistor, said resistor being formed from a material whose resistance increases linearly with increasing temperature and at a rate to change the voltage applied to the voltage responsive device in proportion to the increase in the temperature of the autotransformer, the reactor and the voltage responsive device.

6. In combination, a three phase circuit having three phase conductors, a single phase voltage responsive device, means for applying a temperature compensated single phase voltage from said three phase circuit to said single phase voltage responsive device comprising a positive-sequence network including an autotransformer connected between two of the conductors of the three phase circuit, a resistor connected to one of said two conductors and a reactor connected in series with said resistor and to the third of said three conductors, the voltage responsive device being connected between a point on said autotransformers and a point on said resistor, said resistor being formed from a material whose resistance increases linearly with increasing temperature, and means for causing the temperature of the resistor to change in proportion to the temperature of the voltage responsive device and the positive-sequence network.

7. In combination, a three phase circuit having three phase conductors, a single phase voltage responsive device, means for applying a temperature compensated single phase voltage from said three phase circuit to said single phase voltage responsive device comprising a positive-voltage responsive device comprising a positive-sequence network including an autotransformer connected between two of the conductors of the three phase circuit, a resistor connected to one of said two conductors and a reactor connected in series with said resistor and to the third of said three conductors, the voltage responsive device being connected between a point on said autotransformers and a point on said resistor, said resistor being formed from a material whose resistance increases linearly with increasing temperature, said resistor and said voltage responsive device being positioned in intimate thermal relation for effecting like changes in temperature of the two elements.

8. In combination, a three phase circuit having three phase conductors, a single phase voltage responsive device, means for applying a temperature compensated single phase voltage from said three phase circuit to said single phase voltage responsive device comprising a positive-voltage responsive device comprising a positive-sequence network including an autotransformer connected between two of the conductors of the three phase circuit, a resistor connected to one of said two conductors and a reactor connected in series with said resistor and to the third of said three conductors, the voltage responsive device being connected between a point on said autotransformer and a point on said resistor, said resistor being formed from a material whose resistance increases linearly with increasing temperature, said resistor and said voltage responsive device being designed to have the same thermal time constant for effecting proportional changes in temperature.

9. In a regulator system, apparatus including rectifier and means for supplying a regulated unidirectional current to a load circuit from an alternating-current source, means including a grid-control circuit for controlling the output of said rectifier means, means including a hot-cathode type tube for introducing a control potential into said grid-control circuit, and means for varying the cathode voltage applied to the hot-cathode tube in accordance with the desired control of said load circuit comprising a three phase circuit having three circuit conductors, a positive-phase sequence network including an autotransformer connected between two of the conductors of the three phase circuit, a resistor connected to one of said two conductors and a reactor connected in series with said resistor and to the third of said three conductors, a cathode transformer having its primary winding connected between a point on said resistor and a point on said autotransformer and its secondary winding connected to said cathode, said resistor being formed from a material whose resistance increases linearly with increasing temperature and at a rate to change the voltage applied to the voltage responsive device in proportion to the increase in the temperature of the other parts of the phase sequence network and the voltage responsive device.

10. In a regulator system, apparatus including rectifier means for supplying a regulated unidirectional current to a load circuit from an alternating-current source, means including a grid-control circuit for controlling the output of said rectifier means, means including a hot cathode type tube for introducing a control potential into said grid-control circuit, and means for varying the cathode voltage applied to the hot cathode tube in accordance with the desired control of said load circuit comprising a three phase circuit having three circuit conductors, a positive-phase sequence network including an autotransformer connected between two of the conductors of the three phase circuit, a resistor connected to one of said two conductors and a reactor connected in series with said resistor and to the third of said three conductors, a cathode transformer having its primary winding connected between a point on said resistor and a point on said autotransformer and its secondary winding connected to said cathode, and means for causing the temperature of the resistor to change in proportion to the temperature of the voltage responsive device and the remaining parts of the phase-sequence network.

11. In a regulator system, apparatus including rectifier means for supplying a regulated unidirectional current to a load circuit from an alternating-current source, means including a grid-control circuit for controlling the output of said rectifier means, means including a hot cathode type tube for introducing a control potential into said grid-control circuit, and means for varying the cathode voltage applied to the hot cathode tube in accordance with the desired control of said load circuit comprising a three phase circuit having three circuit conductors, a positive-phase sequence network including an autotransformer connected between two of the conductors of the three phase circuit, a resistor connected to one of said two conductors and a reactor connected in series with said resistor and to the third of said three conductors, a cathode transformer having its primary winding connected between a point on said resistor and a point on said autotransformer and its secondary winding connected to said cathode, said resistor and said voltage responsive device being positioned in intimate thermal relation for effecting like changes in temperature of the two elements.

12. In a regulator system, apparatus including rectifier means for supplying a regulated unidirectional current to a load circuit from an alternating-current source, means including a grid-control circuit for controlling the output of said rectifier means, means including a hot cathode type tube for introducing a control potential into said grid-control circuit, and means for varying the cathode voltage applied to the hot cathode tube in accordance with the desired control of said load circuit comprising a three phase circuit having three circuit conductors, a positive-phase sequence network including an autotransformer connected between two of the conductors of the three phase circuit, a resistor connected to one of said two conductors and a reactor connected in series with said resistor and to the third of said three conductors, a cathode transformer having its primary winding connected between a point on said resistor and a point on said autotransformer and its secondary winding connected to said cathode, said resistor and said voltage responsive device being designed to have the same thermal time constant for effecting proportional changes in temperature.

DONALD W. EXNER.